(12) United States Patent
Bauer

(10) Patent No.: US 6,514,404 B1
(45) Date of Patent: Feb. 4, 2003

(54) FILTER DEVICE

(75) Inventor: Sascha Bauer, Auenwald (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/807,700

(22) PCT Filed: Oct. 21, 1999

(86) PCT No.: PCT/EP99/07317

§ 371 (c)(1),
(2), (4) Date: Jul. 6, 2001

(87) PCT Pub. No.: WO00/23169

PCT Pub. Date: Apr. 27, 2000

(30) Foreign Application Priority Data

Oct. 17, 1998  (DE) .......................................... 198 47 999

(51) Int. Cl.⁷ ........................ B01D 35/143; F02M 37/22
(52) U.S. Cl. .............................. 210/86; 210/90; 210/97; 210/120; 210/171; 210/184; 210/257.1; 210/335; 210/416.4
(58) Field of Search .............................. 210/86, 90, 97, 210/120, 171, 184, 257.1, 335, 416.4, DIG. 5, 149, 112, 114

(56) References Cited

U.S. PATENT DOCUMENTS

| 4,437,986 A | | 3/1984 | Hutchins |
| 4,495,069 A | * | 1/1985 | Davis |
| 4,579,653 A | * | 4/1986 | Davis |
| 5,336,396 A | * | 8/1994 | Shetley |
| 5,832,902 A | * | 11/1998 | Davis et al. |
| 6,032,654 A | * | 3/2000 | Kato |

FOREIGN PATENT DOCUMENTS

| FR | 1385489 A | 5/1965 |
| FR | 2548920 A | 1/1985 |
| GB | 903505 A | 8/1962 |

* cited by examiner

Primary Examiner—Joseph W. Drodge
Assistant Examiner—Terry K. Cecil
(74) Attorney, Agent, or Firm—Crowell & Moring LLP

(57) ABSTRACT

A filter device for separating water and other impurities from liquid fuel including a housing body (11), inside which a first filter element (12) is disposed; a collector vessel (17) which is disposed underneath the filter element (12); a pump (25) which is used to remove water present in the collector vessel (17), and a detector (23) which is used to determine whether water has accumulated in the collector vessel (17).

10 Claims, 5 Drawing Sheets

FILTER DEVICE

BACKGROUND OF THE INVENTION

The invention relates to a filter device for separating water and other impurities from liquid fuels with a housing body having a first filter element disposed in its interior and a water collecting vessel disposed underneath the filter element.

DE 33 06 294 C2 discloses a filter device, which is used to separate water and other impurities from liquid fuels, particularly to separate water and solid particles contained in diesel fuels. The known filter device comprises a housing body in the interior of which a first and a second filter element are arranged. A collector basin is disposed underneath these filter elements. This collector basin has two separate areas for collecting and discharging the impurities and the water. At the lower end, the system is provided with a drain plug. As soon as the removed water has reached a certain amount, the drain plug must be manually opened and the water discharged from the filter device. This is time-consuming; moreover, manual removal of the water is reliable only if an operator checks the entire device at regular intervals.

SUMMARY OF THE INVENTION

The object of the invention is to avoid the aforementioned disadvantages and to provide a filter device for separating water and other impurities from liquid fuels, which provides reliably purified fuel without requiring manual maintenance.

This object is attained by the invention as described and claimed hereinafter.

The substantial advantage of the invention is that an automatic water discharge mechanism is provided in the filter device. This ensures nearly maintenance free operation. Only replacing the filter element requires manual intervention in the system.

According to one embodiment of the invention, the pump works in suction operation or pressure operation, i.e., for suction operation it is disposed in the water discharge line. For pressure operation it is disposed in the fuel intake line and thus generates a positive pressure in the filter device, which is relieved by opening a valve in the water discharge line. The water flows out due to the positive pressure within the filter device.

To prevent problems at extremely low temperatures, the filter device is provided with a heating element. This can be a heat exchanger which is supplied with a heat transfer medium. It is also possible to arrange an electrical heating unit in the system, which is actuated when the temperature falls below a certain level. Instead of a heating element, the fuel return flow may be used to heat the fuel. Due to the heat of the engine, the return flow typically has a higher temperature than the fuel coming from the tank. This heated fuel may be supplied to the filter device via a thermostat valve.

The filter device can comprise two filter systems. The first filter is a prefilter, the second a downstream main filter. The two filter systems can be constructed identically and be linked by corresponding adapter elements.

To monitor the performance of the filters, it is possible in accordance with a further embodiment of the invention to utilize pressure sensors. A pressure sensor can measure, for instance, the differential pressure between intake line and discharge line and signal that the filter needs maintenance when the differential pressure exceeds a certain threshold value. If the fuel is supplied to the filter device at a defined pressure, a sensor is required only in the discharge line. Based on the measurement signal of the sensor, a pressure difference caused by the filter device can be determined and displayed.

If the fuel system has been emptied, the system has to be refilled with a corresponding pump. This pump can for instance be a manually operated pump for venting.

Typically, the filter devices according to the invention are used in trucks, construction machines and the like. To prevent the transfer of vibrations and shocks of the machine to the filter system, a further embodiment of the invention provides for vibration decoupling and arrangement of the filter device on a support structure with corresponding decoupling elements.

These and other features of further preferred embodiments of the invention are set forth in the claims as well as in the description and the drawings. The individual features may be implemented either alone or in combination in the embodiment of the invention or in other fields of application and may represent advantageous embodiments that are protectable per se, for which protection is hereby claimed.

BRIEF DESCRIPTION OF THE DRAWINGS

The invention will now be described in greater detail with reference to working embodiments.

DETAILED DESCRIPTION OF PREFERRED EMBODIMENTS

Figure 1:
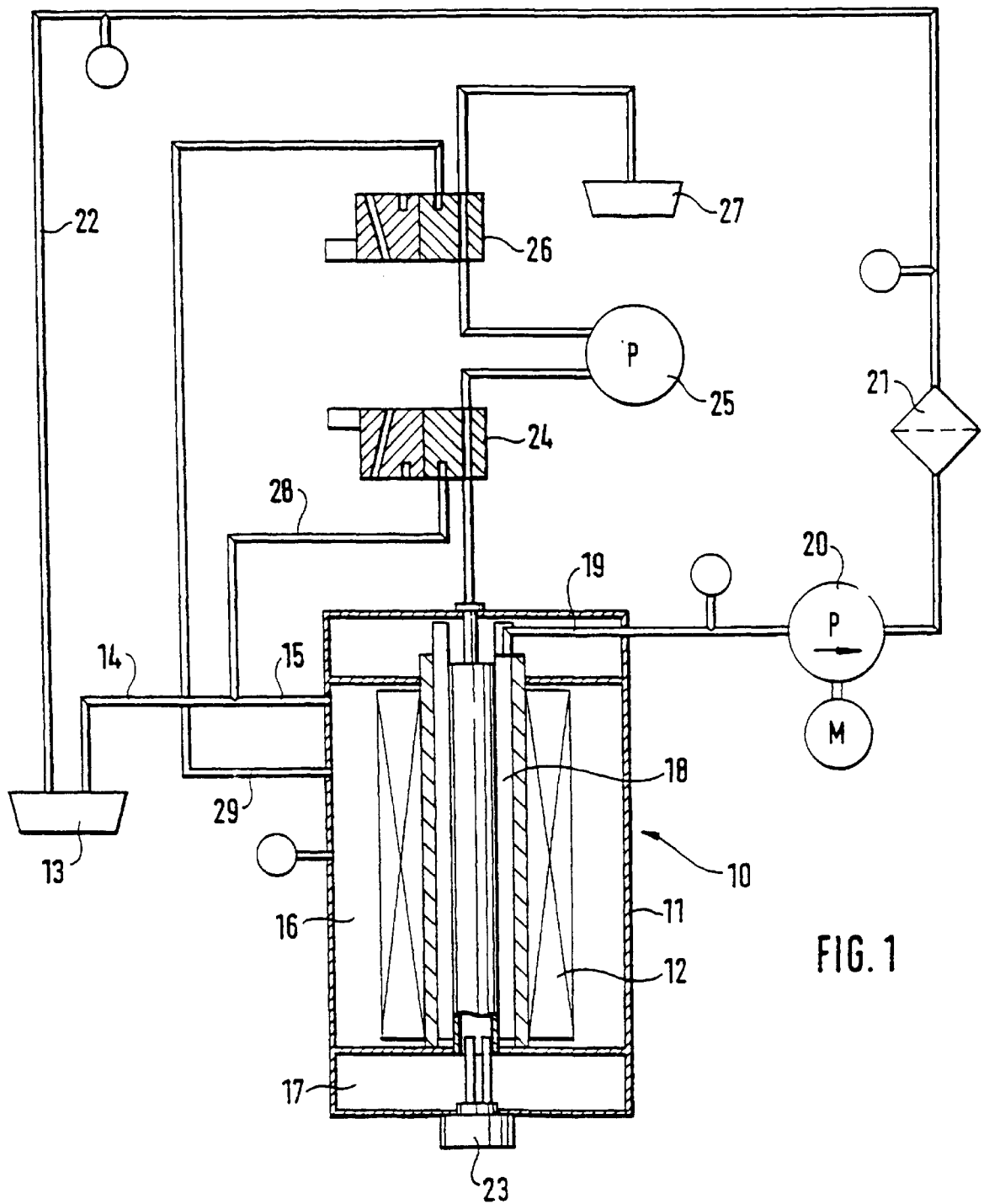
FIG. 1 shows a schematic representation of a filter system.

The filter system according to FIG. 1 comprises a prefilter 10 with a filter housing 11. The filter housing contains a filter element 12. The fluid to be filtered is supplied from a tank 13 via line 14 to a first intake line 15 for prefilter 10. There the fuel enters the contaminated fluid area 16. Any water contained therein settles out in water reservoir 17. The fuel flows through filter element 12 and leaves prefilter 10 purified via clean fluid area 18 and discharge line 19. Via discharge line 19 the fuel reaches a fluid pump 20 where it is highly compressed and guided through a main filter 21 to the injection valves (not shown) of an internal combustion engine. The excess fuel is returned to the tank via line 22.

In prefilter 10 a water sensor 23 is provided. At an appropriately high water level in the water reservoir 17, the water sensor generates a signal that causes the water to be pumped away via a two-way valve 24 by means of pump 25 and to be supplied via the two-way valve to a water discharge vessel 27. To remove the residual water in pump 25 and the various valves 24, 26, the valves are switched. Actuating pump 25 causes fuel to be supplied to the pump via line 28. Due to the switched valve 26, this fuel is supplied via a second feed line 29 to the prefilter 10.

Figure 2:
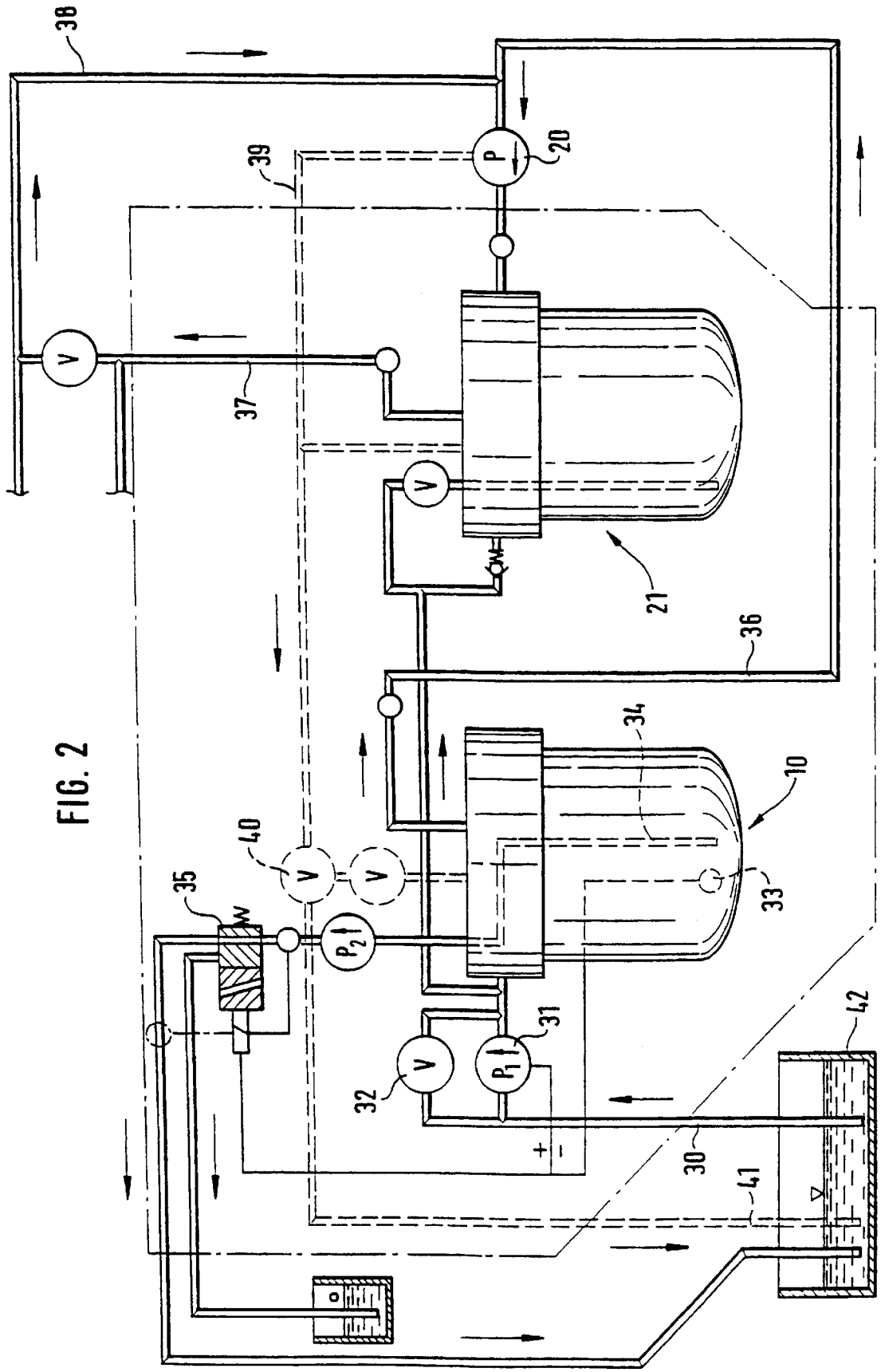
FIG. 2 shows a further variant of a filter system.

FIG. 2 shows a filter system with a prefilter 10 and a main filter 21. Fuel is supplied to prefilter 10 via line 30 and pump 31 as well as pressure relief valve 32. In prefilter 10 there is again a sensor 33 to detect any water that has collected on the bottom of the prefilter and a discharge line 34. If the amount of water exceeds a certain measured value, the sensor causes the two-way valve 35 to be opened. Due to the pump pressure of pump 31 the water flows to the water discharge via discharge line 34 and two-way valve 35.

The filtered fuel passes via line 36 and fluid pump 20 to the main filter 21, where it is purified and then leaves the main filter and the filter system via line 37. From there the fuel is conveyed to the individual injector nozzles of an internal combustion engine. The excess fuel is returned via line 38 of fluid pump 20.

To heat the prefilter 10, the excess fuel, which is supplied via line 38 to fluid pump 20, can be diverted there and be provided to the prefilter via line 39 and a thermostat valve 40 in order to heat the fuel contained in the prefilter. If the thermostat valve does not switch over toward prefilter 10, the heated fuel flows via line 41 directly into supply tank 42.

Figure 3:
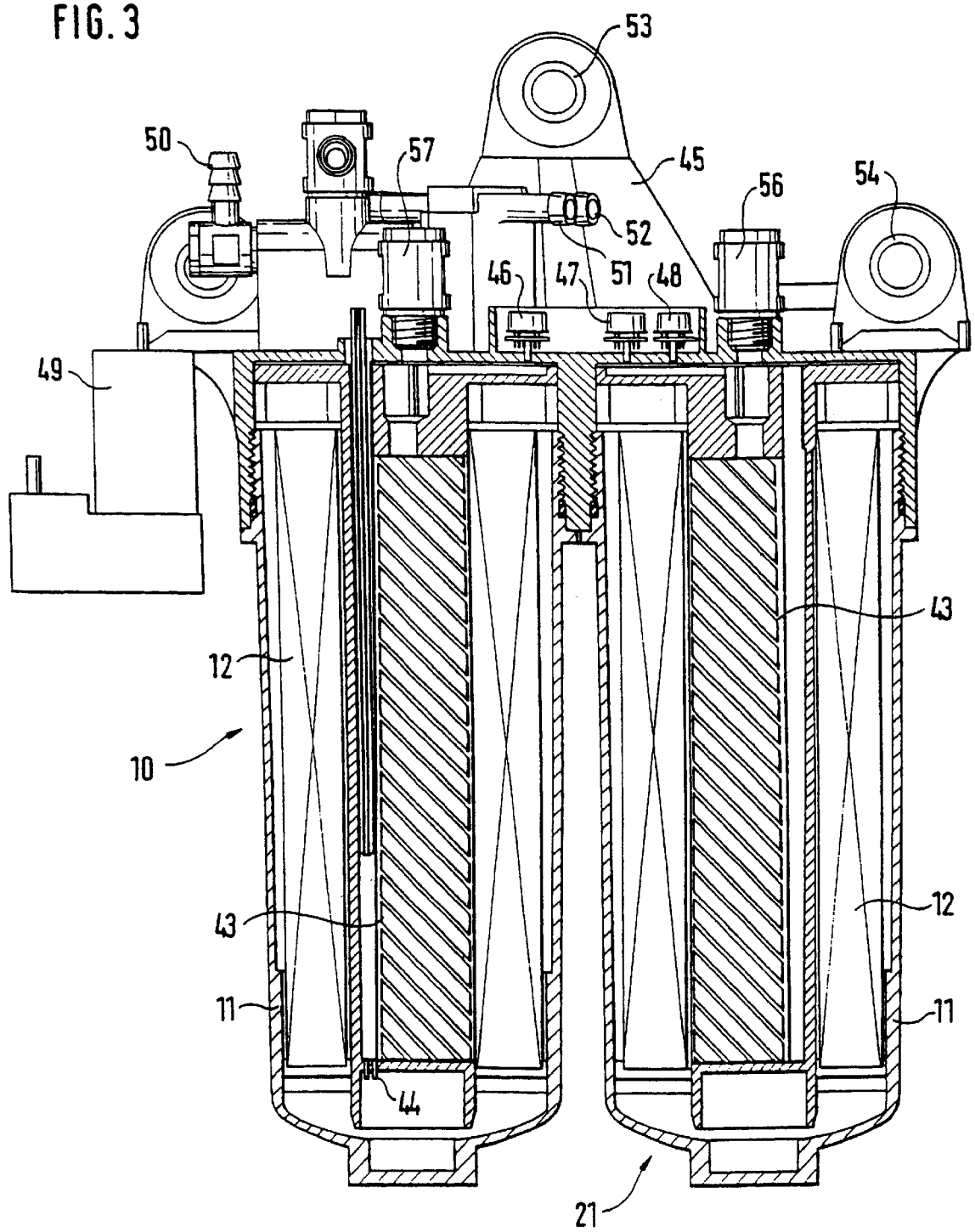
FIG. 3 shows a sectional view of a mechanically detailed filter system.

FIG. 3 shows a detailed sectional view of the individual components of a compact system in which both a prefilter and a main filter are provided. As the drawing shows, the two filters are identically constructed. This results in a significant reduction in the manufacturing cost. Both filters comprise a filter housing 11, each with a filter element 12 therein and a support tube 43. In the prefilter 10 there is also a water sensor 44. The filter housings are directly attached to a filter carrier 45 and can be removed to replace the filter element. The filter carrier includes three sensors. Sensor 46 detects the fuel pressure after the prefilter, sensor 47 the fuel pressure in front of the main filter, and sensor 48 the fuel pressure after the main filter.

Pump 49 for dewatering the prefilter is disposed at the side of the prefilter. In the area of the pump, water outlet 50 is provided. Also visible on the filter carrier are the fluid inlet 51 and fluid outlet 52. It is of course also possible to integrate certain mechanical components in the filter carrier through lines in the filter carrier.

The filter carrier is provided with vibration-decoupling mounting elements 53, 54. These can, for instance, be rubber elastic elements fixed to a mounting structure by means of a screwed connection.

At the prefilter disposed on the right side, the purified fluid is directed outwardly via connection 56 and is supplied via a line (not shown) to the main filter disposed on the left side. The fluid purified in the main filter passes to the fuel injection pump via connection 57.

Figure 4:
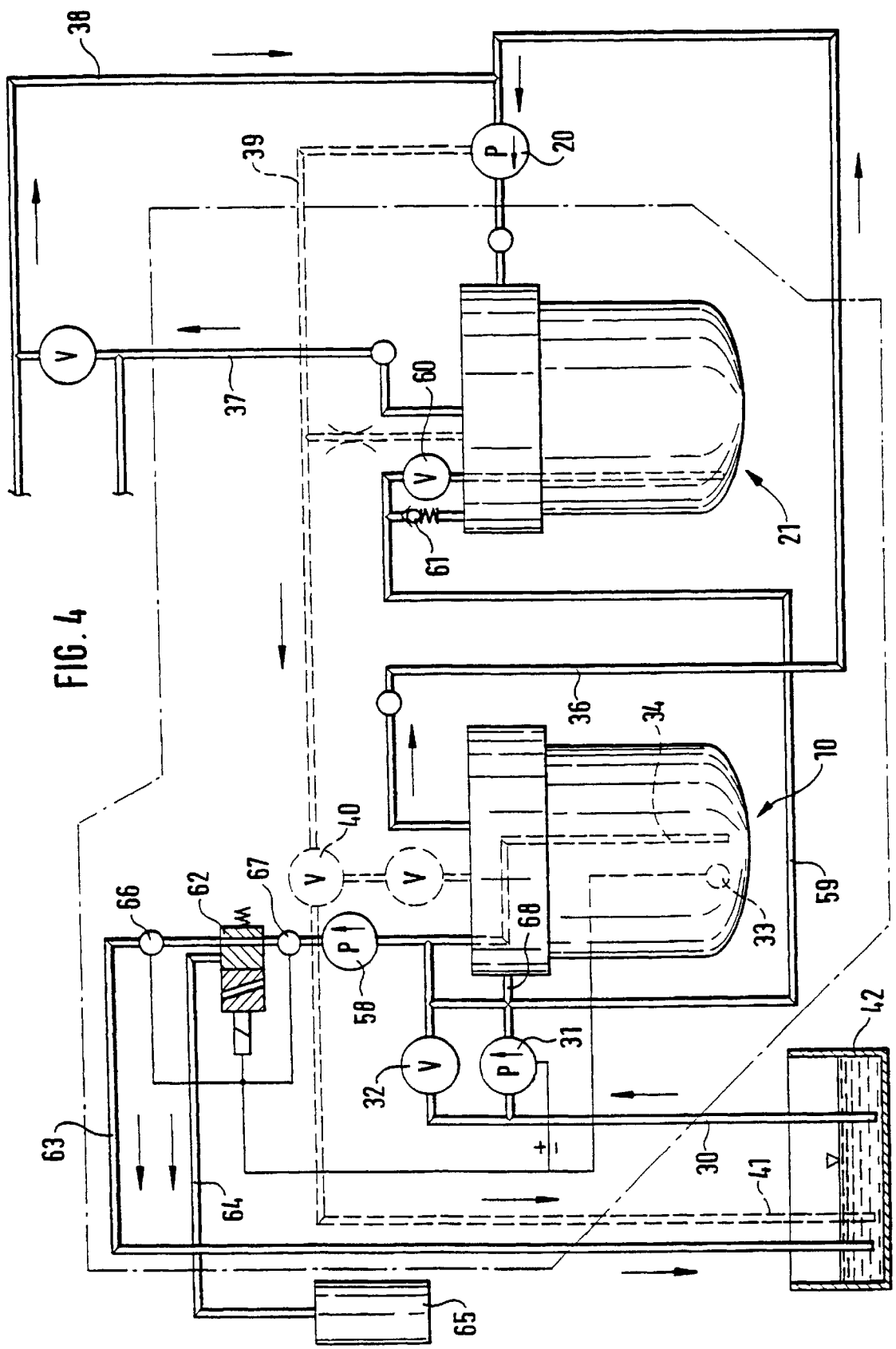
FIG. 4 is a variant of the schematic structure shown in FIG. 2.

FIG. 4 shows a variant of the schematic structure depicted in FIG. 2. The significant difference from the structure of FIG. 2 is that only two pumps are required for filling the entire system, emptying both filters and dewatering the prefilter 10. These are pumps 31 and 58.

The pump 31 pumps the fuel from tank 42 both into the prefilter and via line 59 also into the main filter 21. A valve 60 and a non-return valve 61 are installed in line 59. Above the switching valve 62, which is a two-way valve, there is a line 63 leading to tank 42 and a line 64 leading to a water collector vessel 65. Above and below valve 62, sensors 66, 67 are installed in the line. These sensors generate actuating signals for valve 62.

When the system is initially filled, pump 31 is actuated. Pump 31 fills the main filter 21 via line 59 and non-return valve 61 and the prefilter 10 via line 68. If valve 60 can be opened when main filter 21 is being filled, the non-return valve 61 is not required. It merely represents an alternative embodiment. To remove any water that may have accumulated in the prefilter 10, pump 58 is actuated. Initially the fluid flows through line 63 into tank 42. As soon as water impinges on one of the two sensors 66, 67, the corresponding sensor switches valve 62 so that the water is subsequently discharged via line 64 into the water collector vessel 65. As soon as fuel impinges on sensor 67, it switches valve 62 back to the position shown. After a certain predefined time, pump 58 is turned off.

When the filter elements are replaced, the filters must be emptied. For this purpose, valve 60 is opened. With the aid of pump 58, both prefilter 10 and main filter 21 can now be emptied via line 63.

Pumps 58 and 31 can advantageously be arranged in a common pump module. This has the advantage that the connections are placed within the module so that no external lines are required.

Figure 5:
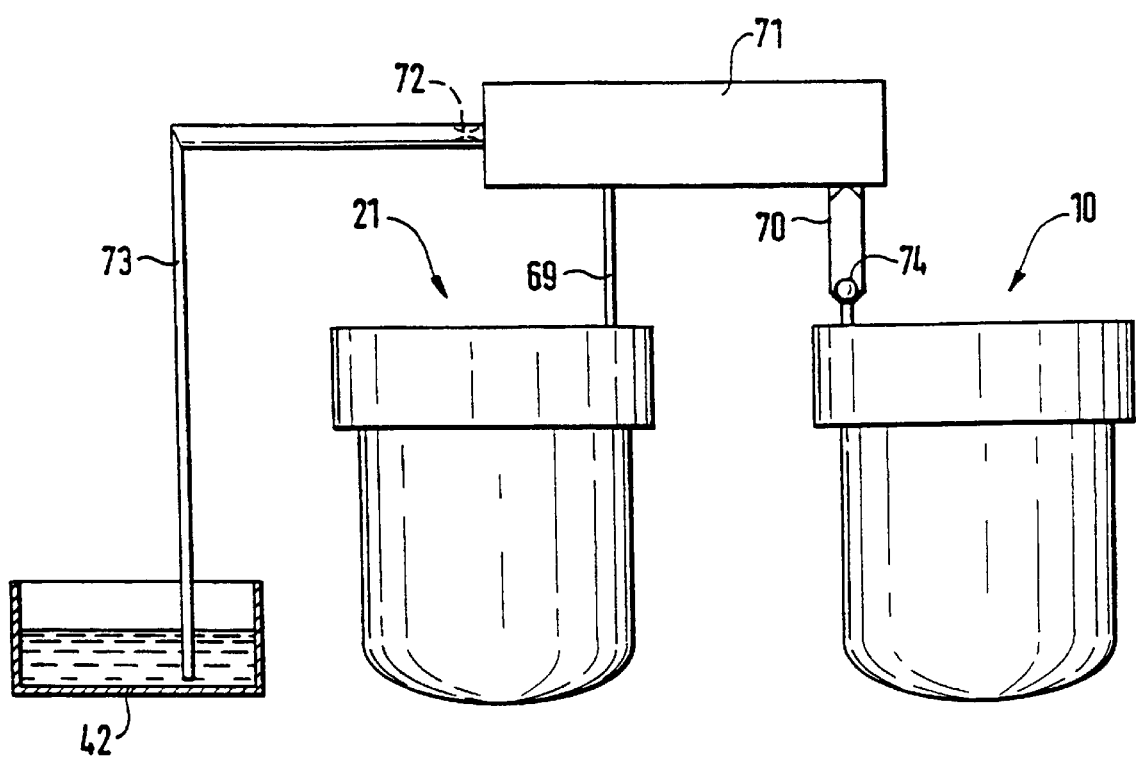
FIG. 5 is a schematic representation of the venting of the two filters.

FIG. 5 shows a schematic illustration of the venting of the two filters 10 and 21. During filling, the air escaping from the enclosed structures flows via line 69 and line 70 into a venting block 71 and from there via a throttle point 72 and line 73 into the fuel tank 42. The escaping air lifts the non-return valve of filter 21, which consists of a ball 74, in upward direction where the ball does not seal an orifice but is merely held. As soon as the system is filled, a suction pump creates a negative pressure in prefilter 21 so that ball 74 moves downwardly and seals the venting opening. In the main filter 21 there is positive pressure. As a result, a small amount of fuel escapes via line 69 and throttle point 72 so that no air cushion can build up in the main filter.

What is claimed is:

1. A filter device for separating water and other impurities from a liquid fuel, the filter device comprising: a first filter including a housing body, a filter element disposed in the interior of said housing body, and a water collector vessel disposed below the filter element; a pump for removing water from said water collector vessel; and a sensor for detecting water accumulated in said collecting vessel, wherein said pump is actuated in response to detection by said sensor of an accumulation of water in said collector vessel, and wherein said pump is disposed on a fuel supply line leading to said first filter and works in pressure operation.

2. A filter device according to claim 1, further comprising a heating element in the housing body.

3. A filter device according to claim 1, further comprising a connection for supplying heated fuel to the first filter to heat the first filter.

4. A filter device according to claim 1, further comprising a second filter downstream of said first filter.

5. A filter device according to claim 4, wherein said second filter has an identical structure to said first filter.

6. A filter device according to claim 4, further comprising a first pressure sensor in a fuel supply line leading to said second filter and a second pressure sensor in a fuel discharge line leading from said second filter for determining fuel pressure upstream and downstream of said second filter.

7. A filter device according to claim 6, further comprising a third pressure sensor in an outlet line from said first filter for detecting the outlet pressure of fuel from said first filter.

8. A filter device according to claim 7, wherein the pressure sensors are arranged together in a sensor system.

9. A filter device according to claim 4, further comprising a manually operable pump for venting at least one of the first and second filters.

10. A filter device according to claim 1, wherein said filter device is mounted on a support structure via decoupling elements so that the filter device is vibration-decoupled from the support structure.

* * * * *